US011312346B2

(12) United States Patent
Michels et al.

(10) Patent No.: US 11,312,346 B2
(45) Date of Patent: Apr. 26, 2022

(54) HYDRAULIC MOTOR VEHICLE BRAKING SYSTEM AND CONTROL UNIT SYSTEM FOR SAME

(71) Applicant: ZF Active Safety GmbH, Koblenz (DE)

(72) Inventors: Erwin Michels, Kail (DE); Benedikt Ohlig, Vallendar (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 191 days.

(21) Appl. No.: 16/603,743

(22) PCT Filed: Mar. 19, 2018

(86) PCT No.: PCT/EP2018/056838
§ 371 (c)(1),
(2) Date: Oct. 8, 2019

(87) PCT Pub. No.: WO2018/188901
PCT Pub. Date: Oct. 18, 2018

(65) Prior Publication Data
US 2021/0129817 A1    May 6, 2021

(30) Foreign Application Priority Data

Apr. 13, 2017 (DE) .......................... 102017003650.0

(51) Int. Cl.
*B60T 13/58* (2006.01)
*B60T 8/1755* (2006.01)
(Continued)

(52) U.S. Cl.
CPC ............ *B60T 13/58* (2013.01); *B60T 8/1755* (2013.01); *B60T 13/142* (2013.01);
(Continued)

(58) Field of Classification Search
CPC ...... B60T 13/58; B60T 8/1755; B60T 13/142; B60T 13/662; B60T 13/74; B60T 17/221;
(Continued)

(56) References Cited

U.S. PATENT DOCUMENTS

2010/0244547 A1    9/2010  Gilles et al.
2015/0115698 A1    4/2015  Brok et al.
(Continued)

FOREIGN PATENT DOCUMENTS

EP          2977282 A1    1/2016
WO     2015106892 A1    7/2015
(Continued)

OTHER PUBLICATIONS

Translation of EP document No. EP 2977282 obtained from website: https://worldwide.espacenet.com on Jun. 9, 2021.*

*Primary Examiner* — Pamela Rodriguez
(74) *Attorney, Agent, or Firm* — Robert James Harwood

(57) ABSTRACT

A hydraulic motor vehicle braking system comprises an electronic stability control (ESC) system of dual-circuit design, a first brake circuit which acts on one or more first wheel brakes, and a second brake circuit which acts on one or more second wheel brakes. The first brake circuit comprises a first hydraulic pressure generator which is electrically controllable for control interventions, and the second brake circuit comprises a second hydraulic pressure generator which is electrically controllable, independently of the first hydraulic pressure generator, for control interventions.

19 Claims, 5 Drawing Sheets

(51) Int. Cl.
*B60T 13/14* (2006.01)
*B60T 13/66* (2006.01)
*B60T 13/74* (2006.01)
*B60T 17/22* (2006.01)
*B60T 13/68* (2006.01)

(52) U.S. Cl.
CPC ............ *B60T 13/662* (2013.01); *B60T 13/74* (2013.01); *B60T 17/221* (2013.01); *B60T 13/686* (2013.01); *B60T 2270/306* (2013.01); *B60T 2270/402* (2013.01); *B60T 2270/403* (2013.01); *B60T 2270/404* (2013.01); *B60T 2270/406* (2013.01); *B60T 2270/82* (2013.01)

(58) Field of Classification Search
CPC ............. B60T 13/686; B60T 2270/306; B60T 2270/402; B60T 2270/403; B60T 2270/406; B60T 2270/404; B60T 2270/82
See application file for complete search history.

(56) References Cited

U.S. PATENT DOCUMENTS

| | | |
|---|---|---|
| 2016/0009267 A1 | 1/2016 | Lesinski, Jr. |
| 2017/0050629 A1 | 2/2017 | Kim |
| 2019/0308596 A1* | 10/2019 | Besier ..................... B60T 8/17 |
| 2020/0114888 A1* | 4/2020 | Michels ............... B60T 8/4072 |

FOREIGN PATENT DOCUMENTS

| | | |
|---|---|---|
| WO | 2015173134 A1 | 11/2015 |
| WO | WO-2016/000865 A1 * | 1/2016 |

* cited by examiner

HYDRAULIC MOTOR VEHICLE BRAKING SYSTEM AND CONTROL UNIT SYSTEM FOR SAME

CROSS-REFERENCE TO RELATED APPLICATION

This application is a national stage of International Application No. PCT/EP2018/056838, filed Mar. 19, 2018, the disclosure of which is incorporated herein by reference in its entirety, and which claimed priority to German Patent Application No. 102017003650.0, filed 13 Apr. 2017, the disclosure of which is incorporated herein by reference in its entirety.

TECHNICAL FIELD

The present disclosure relates in general to the field of motor vehicle braking systems. In particular, a hydraulic motor vehicle braking system and a control unit system for same are described.

BACKGROUND

Known hydraulic motor vehicle braking systems, which are designed as brake-by-wire (BBW) systems or equipped with an electric brake boost (EBB) system, comprise an electrically controllable hydraulic pressure generator which during normal braking operation generates a hydraulic pressure at the wheel brakes of the motor vehicle or boosts a hydraulic pressure that is generated by the driver. For this purpose, a vehicle deceleration that is requested by the driver at a brake pedal is detected by sensor and converted into a control signal for the electrically controllable hydraulic pressure generator.

These types of braking systems generally also include a master cylinder which is mechanically actuatable by means of the brake pedal and via which hydraulic fluid may likewise be conveyed to the wheel brakes. For reasons of operational safety, the master cylinder, actuatable by means of the brake pedal, provides essential redundancy with regard to the electrically controllable hydraulic pressure generator of the BBW- or EBB-system.

Motor vehicle braking systems for autonomous or semi-autonomous driving must also be of redundant design. However, in such cases it cannot be assumed that the driver is present in the vehicle (for example in a remote-controlled parking (RCP) operation), or that the driver is able to immediately actuate a brake pedal (for example, when the driver is looking away from the road). For this reason, in addition to a function unit that provides an electrically controllable main braking function, braking systems for autonomous or semiautonomous driving must also include a further function unit that redundantly implements an electrically controllable auxiliary braking function.

SUMMARY

The object of the present disclosure is to provide a hydraulic motor vehicle braking system with improved redundancy.

According to a first aspect, a hydraulic motor vehicle braking system is provided. The braking system comprises an electronic stability control (ESC) system of dual-circuit design and comprises a first brake circuit that acts on one or more first wheel brakes, and a second brake circuit that acts on one or more second wheel brakes, the first brake circuit comprising a first hydraulic pressure generator that is electrically controllable for control interventions, and the second brake circuit comprising a second hydraulic pressure generator that is electrically controllable for control interventions which is independently controllable of the first hydraulic pressure generator. The braking system also comprises an electric parking brake (EPB) system comprising an electrically controllable first actuator which is associated with one of the first wheel brakes, and an electrically controllable second actuator that is associated with one of the second wheel brakes. In addition, the braking system comprises a controller that is designed to recognize a loss of function of at least one of the two brake circuits, as well as a requirement for a control intervention in the at least one brake circuit that is affected by the loss of function, and upon recognition of the loss of function and the requirement for a control intervention, to control at least one of the actuators for carrying out or assisting with the control intervention.

The braking system according to the first aspect may also comprise an electrically controllable third hydraulic pressure generator which is designed to generate a hydraulic pressure for at least one of the two brake circuits. In this case, the controller may be designed to control the third hydraulic pressure generator upon recognition of the loss of function and the requirement for a control intervention for carrying out or assisting with the control intervention.

Carrying out the control intervention may take place solely by means of the at least one controlled actuator. Alternatively, in addition to the at least one controlled actuator, a further component of the braking system that is capable of control interventions may take part in the control intervention, so that the at least one actuator assists with the control intervention. Such a component may be (when there is only partial loss of function of the brake circuit affected), for example, the first and/or the second (or a third) hydraulic pressure generator.

According to a second aspect, a hydraulic motor vehicle braking system comprises an electronic stability control (ESC) system of dual-circuit design and comprises a first brake circuit that acts on one or more first wheel brakes, and a second brake circuit that acts on one or more second wheel brakes, the first brake circuit comprising a first hydraulic pressure generator that is electrically controllable for control interventions and the second brake circuit comprising a second hydraulic pressure generator that is electrically controllable for control interventions, which is independently controllable from of the first hydraulic pressure generator. The braking system also comprises an electrically controllable third hydraulic pressure generator which is designed to generate a hydraulic pressure for at least one of the two brake circuits, and a controller which is designed to recognize a loss of function of at least one of the two brake circuits as well as a requirement for a control intervention in the at least one brake circuit affected by the loss of function, and upon recognition of the loss of function and the requirement for a control intervention, to control at least the third hydraulic pressure generator for carrying out or assisting with the control intervention.

In one variant of the first or second aspect, the loss of function of the at least one brake circuit is recognized as the requirement for a control intervention in the at least one brake circuit affected by the loss of function. According to another variant, the requirement for a control intervention is recognized separately in time from the recognition of the loss of function of the at least one brake circuit, for example at a later point in time. In this variant, the control of at least one of the actuators for carrying out or assisting with the control intervention may take place immediately when the requirement for a control intervention is recognized, following the recognition of the loss of function of the at least one brake circuit.

Examples of control interventions include one or more of the following interventions: antilock braking control, traction control, vehicle dynamics control in the narrower sense (for example, to prevent over- or understeering), and brake pressure regulation for adaptive cruise control.

According to a third aspect, a hydraulic motor vehicle braking system comprises an electronic stability control (ESC) system of a dual-circuit design comprising a first brake circuit that acts on one or more first wheel brakes, and a second brake circuit that acts on one or more second wheel brakes, the first brake circuit comprising a first hydraulic pressure generator which is electrically controllable for control interventions, and the second brake circuit comprising a second hydraulic pressure generator which is electrically controllable for control interventions and which is independently controllably of the first hydraulic pressure generator. The braking system also comprises an electrically controllable third hydraulic pressure generator which is designed to generate a hydraulic pressure for at least one of the two brake circuits, and a controller which is designed to recognize a loss of function of the third hydraulic pressure generator as well as a driver braking request, and upon recognition of the loss of function of the third hydraulic pressure generator and the driver braking request, to control the first hydraulic pressure generator and/or the second hydraulic pressure generator in order to generate a hydraulic pressure in at least one of the brake circuits according to the driver braking request.

The braking system according to the second or third aspect may also comprise an electric parking brake (EPB) system having an electrically controllable first actuator which is associated with one of the first wheel brakes, and an electrically controllable second actuator which is associated with one of the second wheel brakes. In this case, the controller according to the second aspect may be designed to control at least one of the actuators upon recognition of the loss of function of at least one of the two brake circuits and the requirement for a control intervention for carrying out or assisting with the control intervention. The controller according to the third aspect may be designed to control, according to the driver braking request, at least one of the actuators upon recognition of the loss of function of the third hydraulic pressure generator and the driver braking request.

The following statements apply to the braking system according to all of the aspects presented here.

In one implementation, the braking system is designed as a BBW system which includes the third hydraulic pressure generator and/or is equipped with an EBB system which includes the third hydraulic pressure generator. In an alternative embodiment, the braking system is provided with an electrically controllable vacuum brake booster which acts as the third hydraulic pressure generator.

The BBW system may provide a mechanical decoupling of a brake pedal from a master cylinder of the braking system. In the event of an error in the BBW system, this mechanical decoupling may be canceled in favor of mechanical engagement (This is also called pushthrough (PT)).

The EBB system or the electrically controllable vacuum brake booster may not provide such mechanical decoupling or may provide it only in certain cases (for example during regenerative braking) where in the case of a mechanical coupling, a force that acts on the master cylinder by means of the brake pedal is increased, using the third hydraulic pressure generator. For this purpose, the third hydraulic pressure generator may include the master cylinder as well as an electromechanical actuator which, in addition to the brake pedal, mechanically acts on the master cylinder. Alternatively, the third hydraulic pressure generator may include a separate cylinder/piston arrangement which is hydraulically coupled to the master cylinder or the brake circuits, and an electromechanical actuator that acts on the cylinder/piston arrangement.

The first actuator and the second actuator of the EPB system may be electrically controllable independently of one another. The actuators may be based on an electromechanical, electropneumatic, or electrohydraulic principle.

A first sensor may be provided for detecting a hydraulic pressure in the first brake circuit, and a second sensor may be provided for detecting a hydraulic pressure in the second brake circuit. A signal of the first sensor may form the basis for controlling the first hydraulic pressure generator and/or the first actuator. A signal of the second sensor may form the basis for controlling the second hydraulic pressure generator and/or the second actuator.

The first brake circuit and the second brake circuit may have identical designs. The identical design may relate in particular to the electrically controllable and/or hydraulically active components installed in the brake circuits.

The braking system may comprise a first electrical supply system which is designed to supply the first hydraulic pressure generator and/or the first actuator. Additionally or alternatively, the braking system may comprise a second electrical supply system which is designed to supply the second hydraulic pressure generator and/or the second actuator. Separate electrical lines and a separate power source may be associated with each supply system. The first electrical supply system may also be designed to supply the second hydraulic pressure generator and/or the second actuator. Alternatively or additionally, the second electrical supply system may be designed to supply the first hydraulic pressure generator and/or the first actuator. The first electrical supply system and/or the second electrical supply system may also be designed to supply the third hydraulic pressure generator.

At least one of the hydraulic pressure generators, in particular the first and/or the second and/or the third hydraulic pressure generator, may be designed as a motor-pump unit. This that is actuatable via an electric motor comprises, for example, a double-action cylinder-piston arrangement (a plunger-type system, for example), a single-action cylinder-piston arrangement (a plunger-type system, for example), a gear pump, or a radial pump or a axial piston pump.

According to a fourth aspect, an electronic control unit system for the hydraulic braking system presented here is provided according to the first, second, or third aspect. The control unit system comprises a first control unit which is designed to control the first hydraulic pressure generator and the first actuator, as well as a second control unit which is designed to control the second hydraulic pressure generator and the second actuator.

The control unit system may also comprise a third control unit which is designed to control the third hydraulic pressure generator. Alternatively, the first and/or the second control unit may be designed to control the third hydraulic pressure generator.

According to a fifth aspect, an electronic control unit system for the hydraulic braking system presented here according to the third aspect comprises a first control unit which is designed to control the first hydraulic pressure generator, a second control unit which is designed to control the second hydraulic pressure generator, and a third control unit which is designed to control the third hydraulic pressure generator.

When an EPB system is present, the first control unit of the system according to the fifth aspect may be designed to control the first actuator, and the second control unit may be designed to control the second actuator.

The following statements apply to the control unit system according to the fourth aspect or according to the fifth aspect.

In one variant, the first control unit is designed to be operated on the first electrical supply system and/or on the second electrical supply system. Alternatively or additionally, the second control unit is designed to be operated on the first electrical supply system and/or on the second electrical supply system. Alternatively or additionally, the third control unit is designed to be operated on the first electrical supply system and/or on the second electrical supply system. This increases the redundancy and availability of the system. For example, the control units are operated in parallel on the first and the second electrical supply system.

At least two of the control units (the first control unit and the second control unit, for example) may be designed to communicate with one another via a first communication system and a second communication system. This increases the redundancy and availability of the system. For example, the control units communicate in parallel via the first and the second communication system.

The first control unit and the second control unit may form a spatially contiguous control unit assembly. For example, both control units may be installed in a shared housing or in separate housings, but are once again mounted on the same component (a hydraulic unit, for example).

The first control unit may include at least one first processor, and the second control unit may include at least one second processor. The at least one first processor may be provided for controlling the first hydraulic pressure generator and the first actuator. The at least one second processor may be provided for controlling the second hydraulic pressure generator and the second actuator. The third control unit may include at least one third processor.

The at least one first processor and the at least one second processor (and optionally the third processor) may be communicatively connected to one another via a processor interface. The processor communication may encompass the exchange and/or the plausibility checking of control signals or measuring variables (for example, of sensor data of the above-mentioned hydraulic pressure sensors or other sensors).

According to a sixth aspect, a method for operating a hydraulic motor vehicle braking system with an ESC system and an EPB system is provided, where the ESC system is of dual-circuit design and comprises a first brake circuit which acts on one or more first wheel brakes, and a second brake circuit which acts on one or more second wheel brakes, the first brake circuit comprising a first hydraulic pressure generator which is electrically controllable for control interventions, and the second brake circuit comprises a second hydraulic pressure generator which is electrically controllable for control interventions, independently of the first hydraulic pressure generator, and the EPB system comprising an electrically controllable first actuator which is associated with one of the first wheel brakes, and an electrically controllable second actuator which is associated with one of the second wheel brakes. The method includes the steps of recognizing a loss of function of at least one of the two brake circuits and a requirement for a control intervention in the at least one brake circuit affected by the loss of function, and upon recognition of the loss of function and the requirement for a control intervention, controlling at least one of the actuators for carrying out or assisting with the control intervention.

According to a seventh aspect, a method for operating an electrohydraulic motor vehicle braking system with an electronic stability control (ESC) system is provided which is of dual-circuit design and comprises a first brake circuit which acts on one or more first wheel brakes, and a second brake circuit that acts on one or more second wheel brakes, the first brake circuit comprising a first hydraulic pressure generator which is electrically controllable for control interventions, and the second brake circuit comprising a second hydraulic pressure generator which is electrically controllable for control interventions, independently of the first hydraulic pressure generator, and the braking system also comprises an electrically controllable third hydraulic pressure generator which is designed to generate a hydraulic pressure for at least one of the two brake circuits. The method comprises the steps of recognizing a loss of function of at least one of the two brake circuits and a requirement for a control intervention in the at least one brake circuit affected by the loss of function, and upon recognition of the loss of function and the requirement for a control intervention, controlling the third hydraulic pressure generator for carrying out or assisting with the control intervention.

The following statements apply to the method according to the sixth aspect or seventh aspect. Upon recognition of the loss of function or at a later point in time, emergency braking may be carried out, for example to bring the vehicle to a stop as quickly as possible. In this case, the control intervention may take place within the scope of the emergency braking, for example to maintain vehicle stability during the emergency braking.

As a requirement for a control intervention, locking of a braked wheel may be recognized, the control intervention counteracting the locking of the braked wheel. Alternatively or additionally, as a requirement for a control intervention, vehicle dynamics control may be recognized, the control intervention being used for the vehicle dynamics control.

The braking system, as stated above, may also comprise an electrically controllable third hydraulic pressure generator which is designed to generate a hydraulic pressure for at least one of the two brake circuits. In this case, the method may also comprise controlling the third hydraulic pressure generator upon recognition of the loss of function and the requirement for a control intervention, namely, for carrying out or assisting with the control intervention.

As a loss of function of at least one of the two brake circuits, at least one of the following events may be recognized: a loss of function of the first and/or second and/or third hydraulic pressure generator, a loss of function of a control unit associated with the first and/or second and/or third hydraulic pressure generator, and a leak in least one of the brake circuits.

According to an eighth aspect, a method for operating a hydraulic motor vehicle braking system comprising an electronic stability control (ESC) system is provided which is of dual-circuit design and comprises a first brake circuit which acts on one or more first wheel brakes, and a second brake circuit which acts on one or more second wheel brakes, the first brake circuit comprises a first hydraulic pressure generator which is electrically controllable for control interventions, and the second brake circuit comprises a second hydraulic pressure generator for control interventions which is electrically controllable, independently of the first hydraulic pressure generator, the braking system also comprising an electrically controllable third hydraulic pressure generator which is designed to generate a hydraulic pressure for at least one of the two brake circuits. The method includes the steps of recognizing a loss of function of the third hydraulic pressure generator and the driver braking request, and upon recognition of the loss of function and a driver braking request, controlling the first hydraulic pressure generator and/or the second hydraulic pressure generator to generate a hydraulic pressure in at least one of the brake circuits according to the driver braking request.

In addition, a computer program is provided which comprises program code for carrying out the method presented here according to the sixth, seventh, or eighth aspect when the program code runs on a processor (for example, within a motor vehicle control unit). Also provided is a motor vehicle control unit or control unit system (made up of multiple control units), the control unit or control unit system comprising at least one processor and at least one memory, and the at least one memory comprising program code which, when executed by the at least one processor, causes the steps of the method provided here to be carried out.

BRIEF DESCRIPTION OF THE DRAWINGS

Further aspects, particulars, and advantages of the present disclosure result from the following description of exemplary embodiments, with reference to the figures, which show the following.

DETAILED DESCRIPTION

Figure 1:
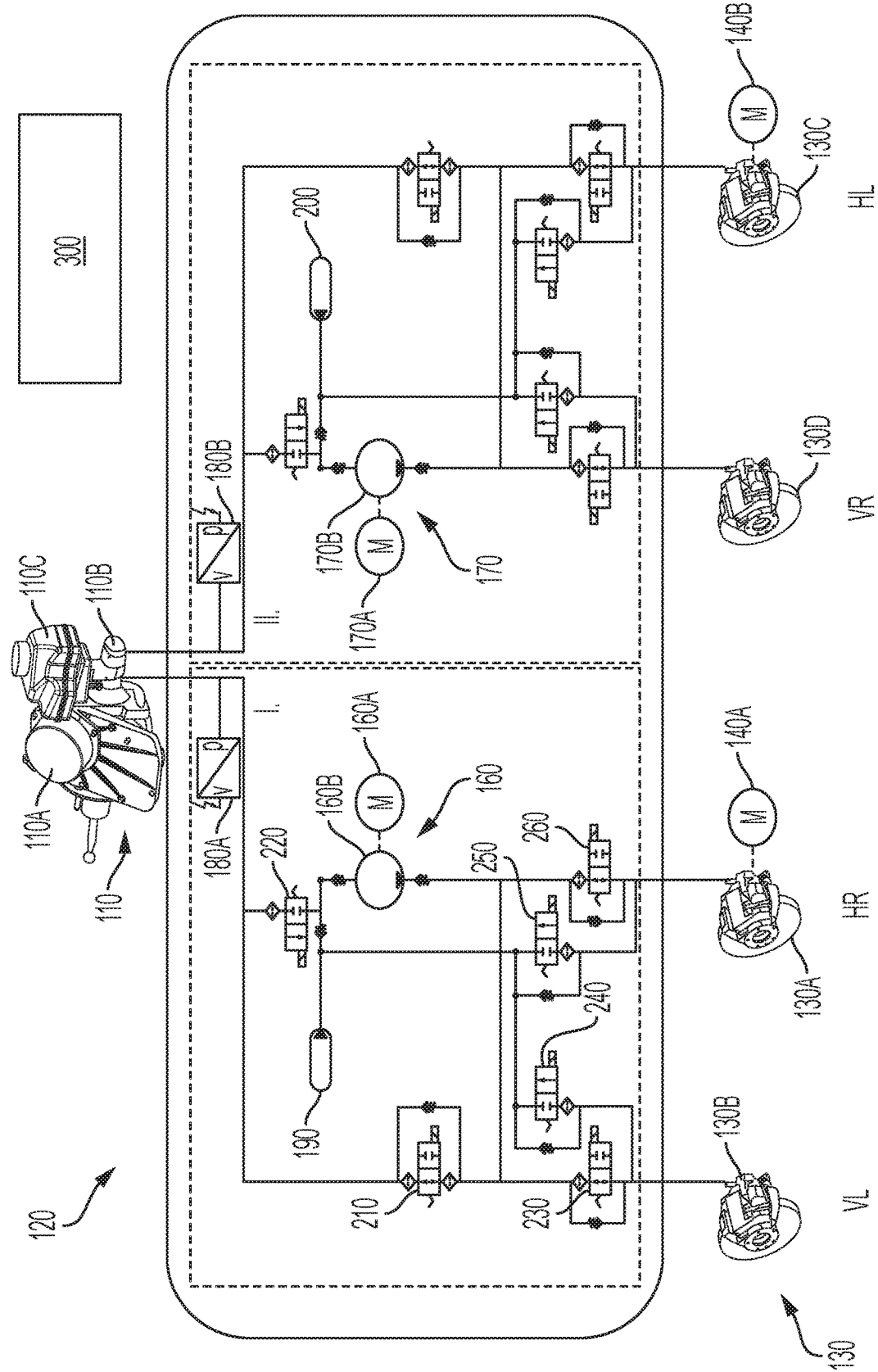
FIG. 1 shows one exemplary embodiment of a hydraulic motor vehicle braking system.

FIG. 1 shows the hydraulic circuit diagram of one exemplary embodiment of a hydraulic motor vehicle braking system 100. The braking system 100 comprises an assembly 110 for hydraulic pressure generation which is coupleable to a brake pedal (not shown), and a hydraulic control module 120 (also referred to as a hydraulic control unit (HCU)) with two separate brake circuits I. and II. The braking system 100 also comprises four wheel brakes 130. Two of the four wheel brakes 130 are associated with brake circuit I., while the other two wheel brakes 130 are associated with brake circuit II. The association of the wheel brakes 130 with the brake circuits I. and II. takes place according to a diagonal distribution in such a way that the wheel brakes 130A and 130B on the right rear wheel (HR) and on the left front wheel (VL), respectively, are associated with brake circuit I., while the wheel brakes 130C and 130D on the left rear wheel (HL) and on the right front wheel (VR), respectively, are associated with brake circuit II. Any other distribution of the wheel brakes 130 on the brake circuits I. and II. would also be conceivable.

The braking system 100 also comprises an EPB system having two electromechanical actuators 140A, 140B which are electrically controllable separately from one another. The actuators 140A, 140B are each indicated in FIG. 1 only in the form of an electric motor. It is understood that the actuators 140A, 140B comprise further components, for example a gear system, via which the actuators 140A, 140B act on the wheel brake cylinders, for example.

The two actuators 140A, 140B have different associations with the four wheel brakes 130. In particular, the actuator 140A is associated with the wheel brake 130A of the right rear wheel rear wheel (HR), while the actuator 140B is associated with the wheel brake 130C of the left rear wheel (HL). Of course, in other variants the two actuators could also be associated with the wheel brakes 130B, 130D of the right front wheel (VR) or the left front wheel (VL), respectively.

The assembly 110 for hydraulic pressure generation includes a master cylinder 110B, and may be operated according to the EBB principle and/or the BBW principle. This means that an electrically controllable hydraulic pressure generator is installed in the assembly 110 which is designed to generate a hydraulic pressure for at least one of the two brake circuits I. and II. This hydraulic pressure generator comprises an electric motor 110A, which for the hydraulic pressure generation acts directly or indirectly on the master cylinder 110B via a mechanical gear system (not denoted). An indirect action may take place hydraulically, for example (for example, by the gear system acting on a plunger system whose output is hydraulically coupled to the input of the master cylinder 110B). In the following discussion, the hydraulic pressure generator installed in the assembly 110 is denoted in general by reference numeral 110B.

The HCU 120 comprises a dual-circuit ESC system for carrying out control interventions in the wheel brakes 130. In particular, the ESC system comprises a first electrically controllable hydraulic pressure generator 160 in the first brake circuit I. and a second electrically controllable hydraulic pressure generator 170 in the second brake circuit II. The two hydraulic pressure generators 160, 170 respectively comprise an electric motor 160A, 170A and a pump 160B, 170B that is actuatable by the electric motor 160A, 170A. Each of the two pumps 160B, 170B may be designed as a multipiston pump, a gear pump, or some other type of pump. Each pump 160B, 170B blocks in the direction opposite its conveying direction, as illustrated by the check valves at the output and input of the pumps 160B, 170B. Since the speed of each of the electric motors 160A, 170A is adjustable, the output of each of the pumps 160B, 170B may also be adjusted by appropriately controlling the associated electric motor 160A, 170A.

The two electric motors 160A, 170A, and thus the two hydraulic pressure generators 160, 170, are independently controllable. This means that each of the two hydraulic pressure generators 160 and 170 can build up a hydraulic pressure independently of the respective other hydraulic pressure generator 170 or 160 in the particular brake circuit I. or II. This redundancy is advantageous with regard to safety considerations.

The braking system 100 operates with the aid of a hydraulic fluid which is stored in portions in three reservoirs 110C, 190, 200. The reservoir 110C is a pressureless reservoir that forms a part of the assembly 110, while the other two reservoirs 190, 200 are respectively installed in one of the two brake circuits I., II. as a pressure accumulator (a low-pressure accumulator (LPA), for example). The two hydraulic pressure generators 160 and 170 are each capable of sucking in hydraulic fluid from the associated reservoir 190 or 200 or from the central reservoir 110C.

The reservoir 110C has a larger capacity than each of the two reservoirs 190, 200. However, the volume of the hydraulic fluid stored in each of the two reservoirs 190, 200 is at least sufficient for allowing a vehicle to be reliably brought to a standstill (for emergency braking, for example), also when brake pressure regulation is necessary at one or more of the wheel brakes 130.

Brake circuit I. comprises a hydraulic pressure sensor 180A situated on the input side of brake circuit I., in the area of the latter's interface with the assembly 110. The signal of the hydraulic pressure sensor 180A may be evaluated in conjunction with control of the hydraulic pressure generator 110B installed in the assembly 110, and/or of the hydraulic pressure generator 160 installed in brake circuit I. The evaluation and control take place by means of a control unit system 300, shown only schematically in FIG. 1. Similarly, a further hydraulic pressure sensor 180B is installed in brake circuit II.

As shown in FIG. 1, the two brake circuits I. and II. are of identical design with regard to the components installed therein and the arrangement of these components. Therefore, only the design and operating principle of the first brake circuit I. are explained in greater detail below.

A plurality of valves which are actuatable by electromagnets, and which in the unactuated, i.e., electrically uncontrolled, state assume the base positions illustrated in FIG. 1, are provided in brake circuit I. In these base positions, the valves couple the assembly 110, in particular the master cylinder 110B, to the wheel brakes 130. Thus, even if there is a loss of function (a failure, for example) of the power supply and an accompanying failure of the hydraulic pressure generator 110B, the driver can still build up hydraulic pressure at the wheel brakes 130 by means of the brake pedal which acts on the master cylinder 110A. However, in the case of an EBB implementation, this hydraulic pressure is not increased, or in the case of a BBW implementation, a mechanical coupling of the brake pedal with the master cylinder 110A takes place (pushthrough (PT) operation). In contrast, during BBW operation the master cylinder 110A is fluidically decoupled from brake circuit I. in a known manner.

The plurality of valves comprises two 2/2-way valves 210, 220 which allow decoupling of the two wheel brakes 130A and 130B from the assembly 110. In particular, the valve 210 is provided for decoupling the wheel brakes 130A, 130B from the assembly 110 in the electrically controlled state when a control intervention in at least one of the two wheel brakes 130A, 130B is carried out by means of the hydraulic pressure generator 160. In its electrically controlled state, the valve 220 allows hydraulic fluid to be sucked in or replenished from the reservoir 110C (for example, if the reservoir 190 is completely emptied in the event of a lengthy control intervention). In addition, in this electrically controlled state a pressure reduction at the wheel brakes 130A, 130B is possible, in that a return flow of hydraulic fluid from the wheel brakes 130A, 130B into the pressureless reservoir 110C is made possible.

The hydraulic connection of the wheel brakes 130A, 130B to the assembly 110 and to the hydraulic pressure generator 160 is determined by four 2/2-way valves 230, 240, 250, 260, which in the unactuated, i.e., electrically uncontrolled, state assume the base positions illustrated in FIG. 1. This means that the two valves 230 and 260 each assume their throughflow position, while the two valves 240 and 250 each assume their blocked position. The two valves 230 and 240 form a first valve arrangement which is associated with the wheel brake 130B, while the two valves 250 and 260 form a second valve arrangement which is associated with the wheel brake 130A.

As explained below, the two valves 210 and 220, the two valve arrangements 230, 240 and 250, 260, and the hydraulic pressure generator 160 are each designed for being controlled for wheel brake pressure control interventions at the particular wheel brake 130A, 130B. The control of the two valves 210 and 220, of the two valve arrangements 230, 240 and 250, 260, and of the hydraulic pressure generator 160 within the scope of the control interventions takes place by means of the control unit system 300. The control unit system 300 implements, for example, the wheel brake pressure control interventions of a vehicle dynamics control system (electronic stability control (ESC), for example), wherein according to the present disclosure the vehicle dynamics control system also includes an antilock braking system (ABS), a traction control system (TCS), and brake pressure regulation for adaptive cruise control (ACC).

The aim of antilock braking control is to prevent locking of the wheels during braking. For this purpose, it is necessary to individually modulate the hydraulic pressure in the wheel brakes 130A, 130B. This takes place by making adjustments in alternation, in a time sequence, to the pressure buildup, pressure maintenance, and pressure reduction phases, which result from suitable control of the valve arrangements 230, 240 and 250, 260 associated with the two wheel brakes 130B and 130A, and optionally of the hydraulic pressure generator 160.

During a pressure buildup phase, the valve arrangements 230, 240 and 250, 260 each assume their base position so that an increase in the brake pressure in the wheel brakes 130A, 130B (such as for BBW braking) may take place by means of the hydraulic pressure generator 160. For a pressure maintenance phase, at one of the wheel brakes 130B or 130A only the valve 230 or 260, respectively, is controlled, i.e., is transferred into its blocked position. Since control of the valve 240 or 250 does not take place, it remains in its blocked position. As a result, the corresponding wheel brake 130B or 130A is hydraulically decoupled, so that a hydraulic pressure present in the wheel brake 130B or 130A is held constant. During a pressure reduction phase, the valve 230 or 260 as well as the valve 240 or 250 is controlled; i.e., the valve 230 or 260 is transferred into its blocked position, and the valve 240 or 250 is transferred into its throughflow position. Thus, hydraulic fluid may flow from the wheel brake 130B or 130A in the direction of the reservoirs 110C and 190 in order to reduce a hydraulic pressure that is present in the wheel brake 130A or 130B.

Other control interventions during normal braking operation take place in an automated manner, and typically independently of an actuation of the brake pedal by the driver. Such automated regulations of the wheel brake pressure take place, for example, in conjunction with traction control, which by means of targeted deceleration prevents spinning of individual wheels during a starting operation, and with vehicle dynamics control in the narrower sense, which adapts the vehicle behavior in the borderline area to the driver's intent and the roadway conditions by means of targeted deceleration of individual wheels, or adaptive cruise control, which among other things maintains a distance from the host vehicle to a preceding vehicle by means of automatic braking.

When automatic hydraulic pressure regulation is being carried out, a hydraulic pressure may be built up at at least one of the wheel brakes 130A or 130B by controlling the hydraulic pressure generator 160. The valve arrangements 230, 240 and 250, 260 associated with the wheel brakes 130B, 130A, respectively, for the hydraulic pressure generator 160 initially assume their base positions illustrated in FIG. 1. A fine adjustment or modulation of the hydraulic pressure may be carried out by appropriately controlling the hydraulic pressure generator 160 and the valves 230, 240 and 250, 260 associated with the wheel brakes 130B and 130A, respectively, as explained above in conjunction with the ABS control.

The hydraulic pressure regulation generally takes place by means of the control unit system 300 as a function of measuring variables that on the one hand describe the vehicle behavior (for example, wheel speeds, yaw speed, transverse acceleration, etc.), and on the other hand measuring variables that describe the driver request (for example, actuation of the brake pedal, the steering wheel angle, etc.). A deceleration request of the driver may be determined, for example, by means of a path sensor that is coupled to the brake pedal or to an input element of the master cylinder 110A. Alternatively or additionally, as the measuring variable that describes the driver request, the brake pressure generated by the driver in the master cylinder 110A may be used, which is then detected by means of the sensor 180A (and the corresponding sensor 180B associated with the brake circuit II.) and optionally subjected to plausibility checking.

Figure 2:
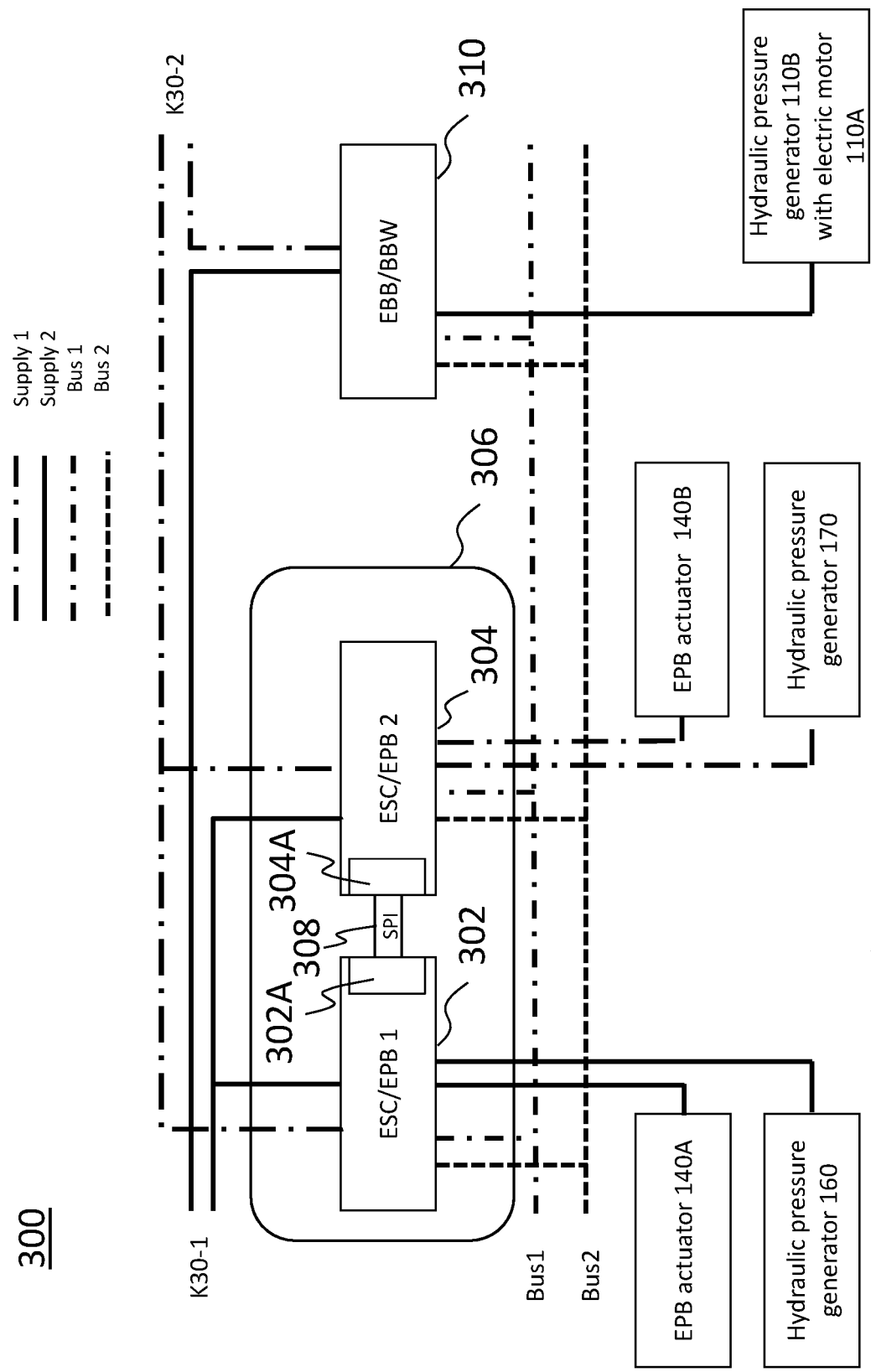
FIG. 2 shows one exemplary embodiment of a control unit system for the braking system according to FIG. 1.

FIG. 2 shows one exemplary embodiment of the control unit system 300 from FIG. 2 [sic; 1]. As illustrated in FIG. 2, the control unit system 300 includes a first control unit 302 which is designed to control the hydraulic pressure generator 160 and the EPB actuator 140A, as well as a second control unit 304 which is designed to control the hydraulic pressure generator 170 and the EPB actuator 140B. As explained in conjunction with FIG. 1, this control may take place based on a plurality of measuring variables that are detected by sensor.

In the exemplary embodiment according to FIG. 2, the two control units 302 and 304 are designed as a spatially contiguous control unit assembly 306. Thus, the two control units 302 and 304 may be accommodated in a shared housing, but include separate processors 302A, 304A for processing the measuring variables and for controlling the associated components 140A, 160 and 140B, 170, respectively. For data exchange, for example in conjunction with the plausibility checking of measuring variables and/or control signals, the corresponding processors 302A, 304A of the two control units 302, 304 are communicatively connected to one another via a processor interface 308. In the exemplary embodiment, the processor interface 308 is designed as a serial-parallel interface (SPI).

The control unit system 300 further comprises a third control unit 310 which is designed to control the hydraulic pressure generator 110B installed in the assembly 310, and thus in particular the electric motor of the hydraulic pressure generator. Depending on the design of the braking system 100, this control may take place according to the EBB principle or the BBW principle. The control unit 310 together with the two other control units 302 and 304 may form a spatially contiguous control unit assembly or may be provided spaced apart from same. In one implementation, a housing of the control unit 310 is integrated into the assembly 110.

As shown in FIG. 2, two parallel electrical supply systems K30-1 and K30-2 are provided. Each of these two supply systems K30-1 and K30-2 comprises a power source and associated power supply lines. In the exemplary embodiment according to FIG. 2, the supply system K30-1 is designed to supply the EPB actuator 140A and the hydraulic pressure generator 160, while the parallel supply system K30-2 is designed to supply the other EPB actuator 140B and the hydraulic pressure generator 170. In another exemplary embodiment, the EPB actuator 140A and the hydraulic pressure generator 160 could be additionally (i.e., redundantly) supplied by the supply system K30-2, and the EPB actuator 140B and the hydraulic pressure generator 170 could be additionally supplied by the supply system K30-1. The system redundancy is further increased in this way.

Each of the three control units 302, 304, and 310 is redundantly supplied, via the supply system K30-1 and also via the supply system K30-2. For this purpose, each of the three control units 302, 304, 310 may be provided with two separate supply connections which in each case are associated with one of the two supply systems K30-1 or K30-2.

As also illustrated in FIG. 2, two parallel communication systems Bus1 and Bus2 are redundantly provided, and in the exemplary embodiment are each designed as a vehicle bus (according to the CAN or LIN standard, for example). The three control units 302, 304, and 310 may communicate with one another via each of these two communication systems Bus1, Bus2.

In the exemplary embodiment according to FIG. 2, the control of the components 140A, 160 and 140B, 170 takes place by means of the two control units 302 and 304, respectively, and the control of the hydraulic pressure generator 110B installed in the assembly 110 takes place by means of the control unit 310, in such a way that the corresponding control unit 302, 304, 310 switches the power supply for the appropriate component on and off and optionally modulates it (by pulse width modulation, for example). In another exemplary embodiment, one or more of these components, in particular the EPB actuators 140A, 140B, may be connected to one or both of the communication systems Bus1, Bus2. In this case, the control of these components by means of the associated control unit 302, 304, 310 then takes place via the corresponding communication system Bus1, Bus2. In addition, in this case the corresponding component may be continuously connected to one or both of the supply systems K30-1, K30-2.

One exemplary embodiment of a method for operating the braking system 100 according to FIG. 1 is explained below with reference to the flow chart 400 according to FIG. 3A. The method may be carried out by means of the control unit system 300 illustrated in FIG. 2, or with a control unit system configured in some other way.

The method begins in step 402 with the recognition of a loss of function of at least one of the brake circuits I., II. The loss of function may be recognized by means of a sensor, for example the hydraulic pressure sensor 180A or 180B, installed in the braking system 100, or in some other way. Thus, a leak in the brake circuit I. and an accompanying loss of function of the brake circuit I. may be recognized by detection of a pressure drop by the hydraulic pressure sensor 180A. In addition, a loss of function of at least one of the two hydraulic pressure generators 160, 170 or of the control unit 302, 304 associated with the respective hydraulic pressure generator 160, 170 may be recognized as a loss of function of the corresponding brake circuit I., II. In the extreme case, the loss of function may result in total failure of the brake circuit I., II. in question.

The requirement for a control intervention in the brake circuit affected by the loss of function is recognized in a further step 404. The steps 402 and 404 may be carried out in any given order, or also simultaneously. Thus, a loss of function of the brake circuit recognized in step 402 may itself represent the requirement for a control intervention according to step 404. In another implementation, the control intervention requirement according to step 404 is different from the loss of function of the brake circuit recognized in step 402. Thus, for example, locking of a braked wheel or the requirement for a control intervention in the narrower sense (for example, see subsequent FIG. 4) may be recognized as a control intervention requirement according to step 404. The corresponding locking of a braked wheel and/or the corresponding driving dynamics control requirement may occur in conjunction with emergency braking. This emergency braking may take place as a response to the loss of function of the brake circuit recognized in step 402, or as a response to some other event (for example, an imminent rear-end collision or a person entering the roadway).

If both a loss of function of the brake circuit (step 402) and the requirement for a control intervention (step 404) have been recognized, at least one of the EPB actuators 140A, 140B and/or the hydraulic pressure generator 110B installed in the assembly 110 are/is controlled in step 406 in order to carry out or assist with the control intervention. For assistance with the control intervention, a further component is controlled in addition to the control of one or more of the above-mentioned components. This further component may be the hydraulic pressure generator 160, for example, if the hydraulic pressure generator 170 is affected by the brake circuit failure (or vice versa).

Another exemplary embodiment of a method for operating the braking system 100 according to FIG. 1 is explained below with reference to the flow chart 500 according to FIG. 3B. The method may be carried out by means of the control unit system 300 illustrated in FIG. 2, or with a control unit system configured in some other way.

The method begins in step 502 with the recognition of a loss of function of the hydraulic pressure generator 110B, which is configured for an EBB and/or BBW implementation. The loss of function may be recognized by means of a sensor installed in the braking system 100, for example the hydraulic pressure sensor 180A or 180B, or in some other way. The loss of function may be a failure of the electric motor 110A (including a failure of its electrical supply) or of the control unit 310. A driver braking request is recognized in a further step 504. This recognition may take place by means of a sensor installed at the brake pedal (a path sensor, for example). If both a loss of function (step 502) and the requirement for a driver braking request (step 504) have been recognized, at least one of the hydraulic pressure generators 160, 170 is controlled in step 506 according to the driver braking request. This control may be used for boosting braking force (EBB implementation) or for generating braking force without a driver force component (BBW implementation).

Figure 3A:
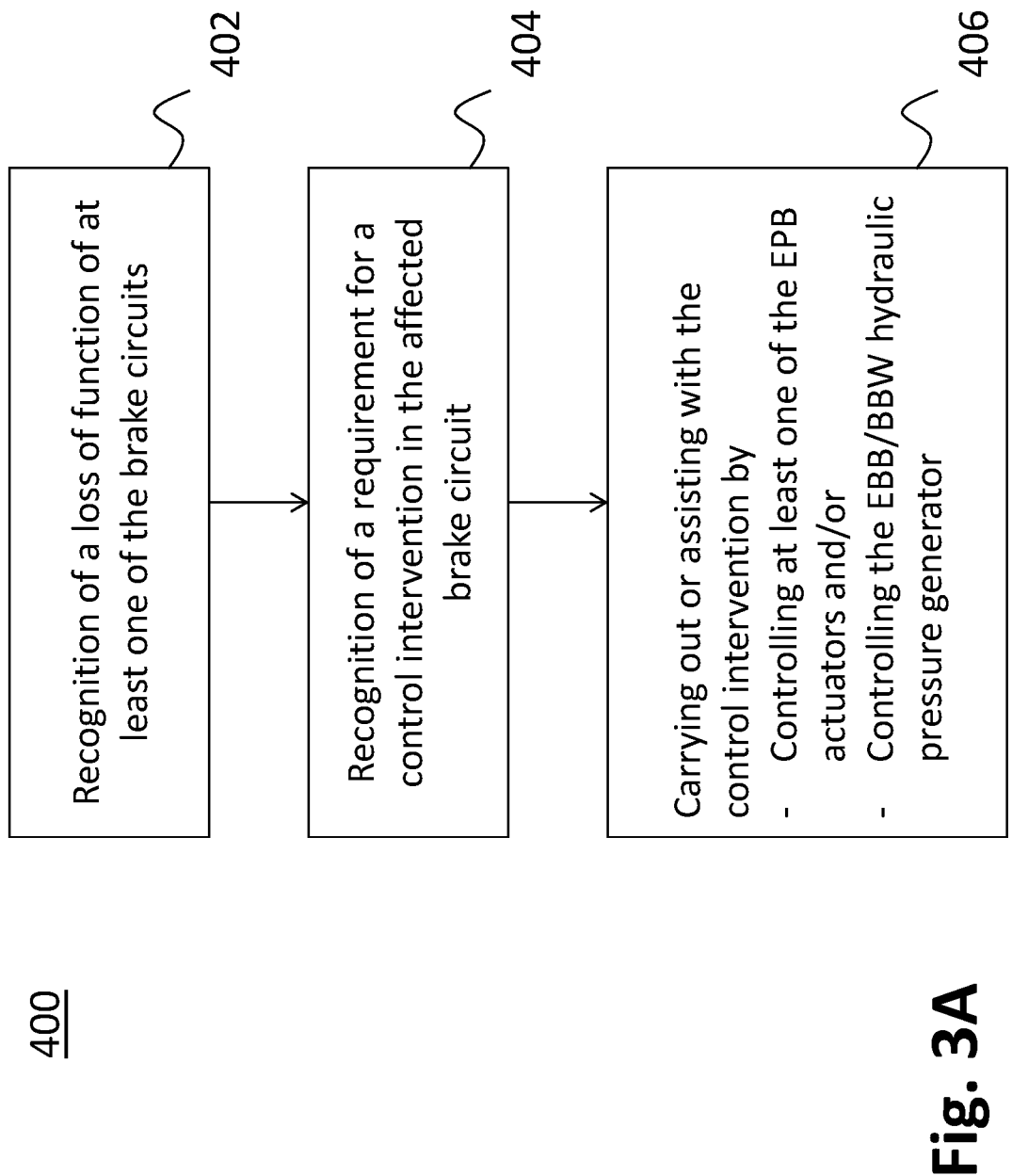
FIGS. 3A/3B show flow charts of exemplary embodiments of a method for operating the braking system according to FIG. 1.
Figure 3B:
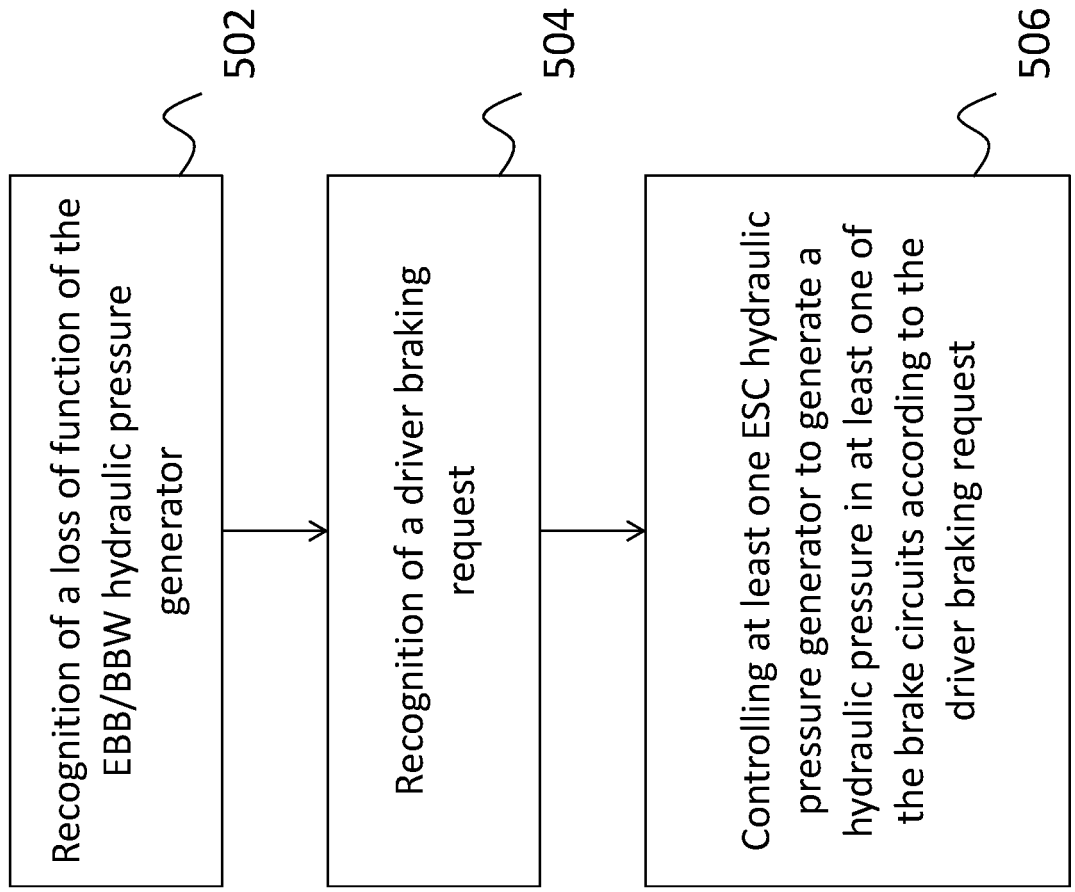

The control concept according to step 406 from FIG. 3A or according to step 506 from FIG. 3B, and the redundancies illustrated in FIGS. 1 and 2, still allow a safety-relevant control intervention or a buildup of braking force to be carried out, even if there is a loss of function of one of the brake circuits I., II. or of the hydraulic pressure generator 110B. This situation is explained below for the scenario according to FIG. 3A by way of example, with reference to the schematic illustration according to FIG. 4.

Figure 4:
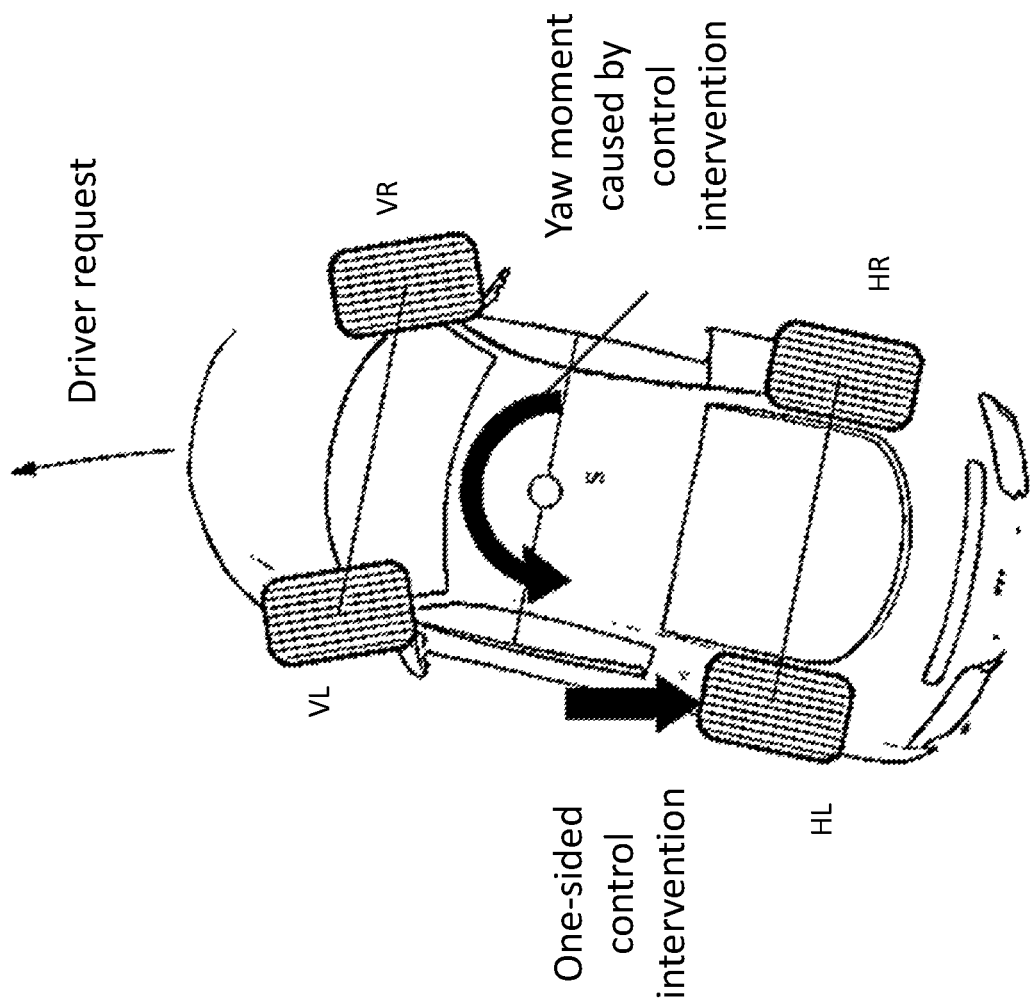
FIG. 4 shows a schematic diagram illustrating a control intervention within the scope of the method according to FIG. 3A.

FIG. 4 shows an assisting control intervention by the EPB actuator 140B when there is a loss of function of brake circuit II. (for example, due to a leak in a hydraulic line or a loss of function of the hydraulic pressure generator 170) in the case of an understeered vehicle. If the loss of function of brake circuit II. is recognized in step 402 of the method illustrated in FIG. 3A, and in addition the requirement for a control intervention due to understeering is recognized in step 404, the control unit 304 selectively controls the EPB actuator 140B in step 406 in order to generate a yaw moment, by means of a one-sided control intervention, which counteracts the understeering.

It is pointed out that FIG. 4 illustrates a control intervention only by way of example, and that step 406 may also be carried out in conjunction with other control interventions. Thus, in the scenario according to FIG. 4, similarly as for a loss of function of brake circuit II. (for example, a loss of function of the hydraulic pressure generator 170), the hydraulic pressure generator 110B may be controlled for carrying out or assisting with the control intervention in step 406 according to FIG. 3A. For this purpose, the valves installed in brake circuit 11. (see FIG. 1) are brought into an appropriate position that allows the one-sided control intervention at the left rear wheel, illustrated in FIG. 4. The corresponding control of the hydraulic pressure generator 110B may take place in addition or as an alternative to the above-described control of the EPB actuator 140B. The corresponding braking torques of the EPB actuator 140B and of the hydraulic pressure generator 110B may therefore overlap in such control interventions.

The three steps 402, 404, and 406 may be carried out by means of the control unit 304. Alternatively, it is possible for the control unit 304 to carry out only step 406, while steps 402 and 404 are carried out by another control unit which signals to the control unit 406 that, for example, the EPB actuator 140B must be controlled. In contrast, the other brake circuit I. is hydraulically functional, and may be additionally used for longitudinal and/or transverse control of the vehicle if necessary. In this regard, the corresponding brake torques may overlap. A corresponding control of the hydraulic pressure generator 160, for example, may in this case take place by means of the control unit 302.

The concepts described herein may be implemented in particular in conjunction with highly automated (i.e., autonomous or semiautonomous) driving in order to meet safety function requirements. Thus, for "level 4" highly automated driving, it is assumed that the driver him/herself is able to again take over control of the vehicle only after a certain waiting period. If an error in the braking system 100 occurs within this waiting period, the technical teaching presented here thus allows an improvement in the basic functionality in comparison to manual driving.

The invention claimed is:
1. A hydraulic motor vehicle braking system, comprising:
an electronic stability control (ESC) system of dual-circuit design comprising a first brake circuit which acts on one or more first wheel brakes, and a second brake circuit fluidly isolated from the first brake circuit which acts on one or more second wheel brakes with the one or more first wheel brakes being fluidly connected to only the first brake circuit and the one or more second wheel brakes being fluidly connected to only the second brake circuit, the first brake circuit comprising a first hydraulic pressure generator which is electrically controllable for control interventions, and the second brake circuit comprising a second hydraulic pressure generator which is electrically controllable for control interventions, independently of the first hydraulic pressure generator;
an electric parking brake (EPB) system comprising an electrically controllable first actuator which is associated with one of the first wheel brakes, and an electrically controllable second actuator which is associated with one of the second wheel brakes; and
a controller which is designed to:
recognize a loss of function of at least one of the two fluidly isolated brake circuits, as well as a requirement for a control intervention in the at least one brake circuit that is affected by the loss of function; and
upon recognition of the loss of function and the requirement for a control intervention, to control at least one of the actuators for carrying out or assisting with the control intervention.

2. The braking system according to claim 1, further comprising
an electrically controllable third hydraulic pressure generator which is designed to generate a hydraulic pressure for at least one of the two brake circuits,
wherein the controller is designed to control the third hydraulic pressure generator upon recognition of the loss of function and the requirement for a control intervention for carrying out or assisting with the control intervention.

3. The braking system according to claim 2, wherein the braking system is also designed as a brake-by-wire system which comprises the third hydraulic pressure generator, and/or is equipped with an electric brake boost system which comprises the third hydraulic pressure generator.

4. The braking system according to claim 1, wherein the first actuator and the second actuator are electrically controllable independently of one another.

5. The braking system according to claim 1, wherein a first sensor for detecting a hydraulic pressure in the first brake circuit and a second sensor for detecting a hydraulic pressure in the second brake circuit are provided.

6. The braking system according to claim 1, wherein the first brake circuit and the second brake circuit are of identical design.

7. The braking system according to claim 1, further comprising
a first electrical supply system which is designed to supply the first hydraulic pressure generator and/or the first actuator; and/or
a second electrical supply system which is designed to supply the second hydraulic pressure generator and/or the second actuator.

8. The braking system according to claim 7, wherein
the first electrical supply system is also designed to supply the second hydraulic pressure generator and/or the second actuator; and/or
the second electrical supply system is also designed to supply the first hydraulic pressure generator and/or the first actuator.

9. The braking system according to claim 1, wherein at least one of the hydraulic pressure generators is designed as a motor-pump unit.

10. An electronic control unit system for a hydraulic braking system according to claim 1, comprising
a first control unit which is designed to control the first hydraulic pressure generator and the first actuator; and
a second control unit which is designed to control the second hydraulic pressure generator and the second actuator.

11. The control unit system according to claim 10, wherein at least two of the control units are designed to communicate with one another via a first communication system and a second communication system.

12. The control unit system according to claim 10, wherein the first control unit and the second control unit form a spatially contiguous control unit assembly.

13. The control unit system according to claim 12, wherein the first control unit includes a first processor and the second control unit includes a second processor, which are communicatively connected to one another via a processor interface.

14. A method for operating an electrohydraulic motor vehicle braking system having an electronic stability control (ESC) system and an electric parking brake (EPB) system, wherein the ESC system is of dual-circuit design and comprises a first brake circuit which acts on one or more first wheel brakes, and a second brake circuit fluidly isolated from the first brake circuit which acts on one or more second wheel brakes with the one or more first wheel brakes being fluidly connected to only the first brake circuit and the one or more second wheel brakes being fluidly connected to only the second brake circuit, the first brake circuit comprising a first hydraulic pressure generator which is electrically controllable for control interventions, and the second brake circuit comprising a second hydraulic pressure generator which is electrically controllable for control interventions, independently of the first hydraulic pressure generator, and wherein the EPB system comprises an electrically controllable first actuator which is associated with one of the first wheel brakes, and an electrically controllable second actuator which is associated with one of the second wheel brakes, the method comprising the steps:
Recognizing a loss of function of at least one of the two fluidly isolated brake circuits as well as a requirement for a control intervention in the at least one brake circuit affected by the loss of function; and
Upon recognition of the loss of function and the requirement for a control intervention, controlling at least one of the actuators for carrying out or assisting with the control intervention.

15. The method according to claim 14, wherein upon recognition of the loss of function, emergency braking is carried out and the control intervention takes place within the scope of the emergency braking.

16. The method according to claim 14, wherein as a requirement for a control intervention, locking of a braked wheel is recognized, and the control intervention counteracts the locking of the braked wheel.

17. The method according to claim 14, wherein as a requirement for a control intervention, vehicle dynamics control is recognized, and the control intervention is used for the vehicle dynamics control.

18. The method according to claim 14, wherein
the braking system also comprises an electrically controllable third hydraulic pressure generator which is designed to generate a hydraulic pressure for at least one of the two brake circuits; and
wherein the method further comprises the step:
upon recognition of the loss of function and the requirement for a control intervention, controlling the third hydraulic pressure generator for carrying out or assisting with the control intervention.

19. The method according to claim 18, wherein
as a loss of function of at least one of the two brake circuits, at least one of the following events is recognized:
a loss of function of the first and/or second and/or third hydraulic pressure generator;

a loss of function of a control unit associated with the first and/or second hydraulic pressure generator; and
a leak in at least one of the brake circuits.

\* \* \* \* \*